United States Patent [19]

Imazeki et al.

[11] 4,426,180

[45] Jan. 17, 1984

[54] TRACER CONTROL SYSTEM

[75] Inventors: Ryoji Imazeki; Etsuo Yamazaki; Hitoshi Matsuura, all of Hachioji, Japan

[73] Assignee: Fujitsu Fanuc Limited, Tokyo, Japan

[21] Appl. No.: 292,274

[22] Filed: Aug. 12, 1981

[30] Foreign Application Priority Data

Aug. 27, 1980 [JP] Japan .................. 55-118134

[51] Int. Cl.³ .................................. B23Q 35/14
[52] U.S. Cl. ............................ 409/99; 318/578; 409/127
[58] Field of Search ............ 409/98, 99, 85, 93, 409/127; 318/578, 576

[56] References Cited

U.S. PATENT DOCUMENTS

| 2,263,765 | 11/1941 | Elberty, Jr. .............. 409/98 X |
| 2,307,503 | 1/1943 | Gulliksen ................. 409/99 |
| 3,204,533 | 9/1965 | Hold et al. ............... 409/99 X |
| 4,044,289 | 8/1977 | Wenzel et al. ............ 409/99 X |

FOREIGN PATENT DOCUMENTS

| 34006 | 8/1981 | European Pat. Off. ........ 409/99 |
| 54-161173 | 12/1979 | Japan ....................... 409/99 |
| 55-157454 | 12/1980 | Japan ....................... 409/99 |
| 650784 | 3/1979 | U.S.S.R. .................... 409/99 |

Primary Examiner—William R. Briggs
Attorney, Agent, or Firm—Staas & Halsey

[57] ABSTRACT

A tracer control system which performs tracer control based on a displacement signal from a tracer head tracing the surface of a model and is equipped with the function of freely setting the infeed of a cutter for machining a workpiece. The tracer control system is provided with a first drive system for feeding the tracer head in the Z-axis direction, a second drive system for feeding the cutter head in the Z-axis direction, first and second position detectors for detecting the positions of the tracer head and the cutter head in the Z-axis direction, and a superimposing circuit for superimposing on each other a position detection signal from the first position detector and an infeed command signal for setting the infeed of the cutter head. The cutter head is fed by the second drive system in the Z-axis direction so that the difference between output signals from the superimposing circuit and the second position detector may be reduced to zero.

3 Claims, 2 Drawing Figures

TRACER CONTROL SYSTEM

BACKGROUND OF THE INVENTION

1. Field of the Invention

The present invention relates to a tracer control system which is capable of freely setting the infeed or cutting depth of a cutter.

2. Description of the Prior Art

In a tracer control system of the type that calculates a trace direction and a trace velocity based on a signal from a tracer head tracing the surface of a model, the tracer head and a cutter head having mounted thereon a cutter for cutting a work-piece are usually coupled together by a rigid body so that they may be fed bodily. By such unitary feed of the tracer head and the cutter head, the workpiece can be machined into the same configuration as the model.

Since the cutter head always follows the movement of the tracer head, however, the infeed of the cutter is not necessarily appropriate when a stylus traces the model surface. The factors, to this are the length of the tool used, the manner of setting up the model and the workpiece, the shape of the workpiece and so forth. In order to prevent improper infeed of the cutter, it is customary in the prior art to provide on the side of the tracer head or the cutter head a mechanical feed mechanism for adjusting their relative positions in the Z-axis direction, thereby to adjust the infeed of the cutter. Such a mechanical feed mechanism is similarly employed also in a tracer control machine tool in which the tracer head and the cutter head are not coupled together by a rigid body but have independent drive systems and are placed under synchronous control.

SUMMARY OF THE INVENTION

The present invention is to provide a tracer control system which is of the type that the tracer head and the cutter head are not coupled together by a rigid body but have independent drive systems and are placed under synchronous control and in which a command signal is applied to either one of the synchronously controlled drive systems to provide an appropriate infeed of the cutter without the necessity of using the abovesaid mechanical feed mechanism.

Briefly stated, the tracer control system of the present invention is of the type performing tracer control based on a displacement signal from a tracer head tracing the surface of a model and is provided with a first drive system for feeding the tracer head in the Z-axis direction, a second drive system for feeding the cutter head in the Z-axis direction, first and second position detectors for detecting the positions of the tracer head and the cutter head in the Z-axis direction, and a superimposing circuit for superimposing a position detection signal from the first position detector and an infeed command signal on each other, the infeed command signal being a signal for setting the infeed of the cutter head. The cutter head is fed by the second drive system in the Z-axis direction so that the difference between output signals from the superimposing or adding circuit and the second position detector may be reduced to zero.

DESCRIPTION OF THE REFERRED EMBODIMENTS

Figure 1:
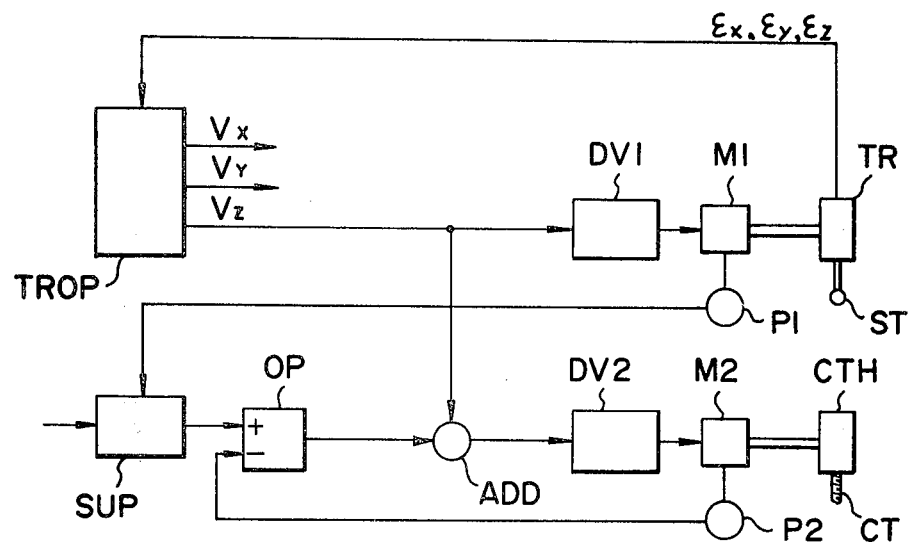
FIG. 1 is a block diagram illustrating an embodiment of the present invention.

In FIG. 1, reference character TR indicates a tracer head; ST designates a stylus; CTH identifies a cutter head; CT denotes a cutter; M1 represents a motor for feeding the tracer head TR in the Z-axis direction; M2 shows a motor for feeding the cutter head CTH in the Z-axis direction; P1 and P2 refer to position detectors for detecting the positions of the tracer head TR and the cutter head CTH in the Z-axis direction to yield position detection signals; DV1 and DV2 indicate drive circuits for driving the motors M1 and M2, respectively; ADD designates an adder; TROP identifies a trace arithmetic unit; SUP denotes a superimposing circuit; and OP represents an arithmetic circuit. In FIG. 1, a work table for mounting thereon a model and a workpiece, two motors for feeding the work table in the X-axis and Y-axis directions and their drive circuits are not shown for the sake of brevity.

The tracer head TR produces displacement signals $\epsilon_x$, $\epsilon_y$ and $\epsilon_z$ in the X-axis, Y-axis and Z-axis directions which correspond to displacement of the stylus ST moving in contact wit a model (not shown), and the displacement signals are applied to the race arithmetic unit TROP. Based on the displacement signals $\epsilon_x$, $\epsilon_y$ and $\epsilon_z$ of the tracer head TR, the trace arithmetic unit TROP provides velocity signals $V_x$, $V_y$ and $V_z$ indicating trace velocities in the X-axis, Y-axis and Z-axis directions. The velocity signals $V_x$ and $V_y$ indicating the trace velocities in the X-axis and Y-axis directions are provided to drive circuits for operating motors (not shown) to feed the abovesaid work table (not shown) in the X-axis and Y-axis directions. The velocity signal $V_z$ indicating the trace velocity in the Z-axis direction is applied to the drive circuit DV1 of the motor M1 for feeding the tracer head Tr in the Z-axis direction and the adder ADD. Accordingly, the tracer head TR is fed in the Z-axis direction at a velocity corresonding to the velocity signal $V_z$. The position of the tracer head TR thus fed in the Z-axis direction is always detected by the position detector P1, from which the position detection signal indicating the detected position of the tracer head TR is provided to the superimposing circuit SUP.

The superimposing circuit SUP is to superimpose the position detection signal from the position detector P1 and an infeed command signal for setting the infeed of the cutter CT, and the output signal of the superimposing circuit SUP is applied to the one input terminal of the arithmetic circuit OP. The arithmetic circuit OP is to obtain the difference betweeen the output signal of the superimposing circuit SUP and the position detection signal from the position detector P2 which indicates the position of the cutter head CTH in the Z-axis direction. The output signal of the arithmetic circuit OP and the velocity $V_z$ are added together by the adder ADD and the added output is provided to the drive circuit DV2 of the motor M2. Accordingly, when applying an infeed command signal to the superimposing circuit SUP, the motor M2 feeds the cutter head CTH in the Z-axis direction at a velocity different from that of the tracer head TR in the Z-axis direction so that the position detection signal derived from the position detector P2 may become equal to the output signal from the superimposing circuit SUP. In consequence, the position of the cutter head CTH in the Z-axis direction deviates from the position of the tracer head TR in the Z-axis direction by a distance corresponding to the infeed command signal. After the position detection signal from the position detector P2 and the output signal from the superimposing circuit SUP become equal to each other, the output signal from the arithmetic circuit OP is reduced to zero, so that the cutter head CTH is fed in the Z-axis direction at the velocity corresponding to the velocity signal $V_z$, that is, at the same velocity as that of the tracer head TR fed in the Z-axis direction.

Figure 2:
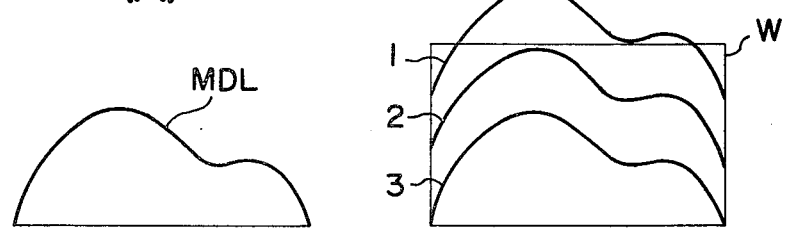
FIGS. 2(A) and 2(B) are explanatory of the operation of the embodiment depicted in FIG. 1.

Accordingly, for example, in the case of tracing a model MDL of FIG. 2(A) by the tracer head TR to machine a workpiece W of FIG. 2(B), the cutter CT can be moved along loci 1, 2 and 3 one after another by sequentially applying infeed command signals of predetermined distances, as depicted in FIG. 2(B), whereby it is possible to prevent breakage of the cutter CT or the like because of too large an infeed of the cutter.

As has been described in the foregoing, the tracer control system of the present invention is provided with a first drive system composed of the drive circuit DV1 and the motor M1 for feeding the tracer head in the Z-axis direction, a second drive system composed of the drive circuit DV2 and the motor M2 for feeding the cutter head in the Z-axis direction, first and second position detectors for detecting the positions of the tracer head and the cutter head in the Z-axis direction, and a superimposing circuit for superimposing a position detection signal from the first position detector and an infeed command signal on each other. The cutter head is fed by the second drive system in the Z-axis direction so that the difference between the output signal from the superimposing circuit and the position detection signal from the second position detector may be reduced to zero. Therefore, the present invention has the advantage that the infeed of the cutter head in the Z-axis direction can freely be set without the necessity of newly providing a mechanical feed mechanism, by applying an infeed signal to one of synchronously-controlled drive systems which are indispensable to the system configuration.

It will be apparent that many modifications and variations may be effected without departing from the scope of the novel concepts of this invention.

What is claimed is:

1. A tracer control system which performs tracer control according to a tracer control signal based on a displacement signal from a tracer head tracing the surface of a model, said system comprising:
   a first drive system for feeding said tracer head in the Z-axis direction;
   a second drive system for feeding a cutter head in the Z-axis direction;
   first and second position detectors for respectively detecting the positions of said tracer head and said cutter head in the Z-axis direction and for providing corresponding position signals;
   a superimposing circuit for adding said position signal from said first position detector and an infeed command signal setting the infeed of said cutter head and for providing an output signal corresponding to the addition; and
   means for forming the difference between the output signal from said superimposing circuit and the detected position signal from said second position detector and for supplying same to control said second drive system,
   wherein desired infeed of the cutter can be provided by said infeed command signal, taking into account said position signal from said second position detector.

2. The system of claim 1, comprising an arithmetic circuit for outputting the difference between said output signal of said superimposing circuit and said position signal of said second position detector.

3. The system of claim 2, comprising an adder for summing said difference that is output from said arithmetic circuit and the respective component of said tracer control signal, the output of said adder being provided to said second drive system for controlling the position of said cutter.

* * * * *

UNITED STATES PATENT AND TRADEMARK OFFICE
CERTIFICATE OF CORRECTION

PATENT NO. : 4,426,180

DATED : 17 January 1984

INVENTOR(S) : Imazeki et al

It is certified that error appears in the above-identified patent and that said Letters Patent is hereby corrected as shown below:

Front Page, [75] Inventors, "Hachioji" should be --Tokyo--;
[56] References Cited, "2,263,765" should be --2,263,764--.

Col. 1, line 23, "factors," should be --factors contributing--.

Col. 2, line 26, "wit" should be --with--;
line 27, "race" should be --trace--;
line 39, "Tr" should be --TR--.

Signed and Sealed this

Third Day of July 1984

[SEAL]

Attest:

GERALD J. MOSSINGHOFF

*Attesting Officer*  *Commissioner of Patents and Trademarks*